Patented Apr. 23, 1946

2,398,803

UNITED STATES PATENT OFFICE 2,398,803

HALOGENATED POLYMERS OF ETHYLENE AND PROCESS OF PREPARATION

James Robertson Myles and Francis Stephen Bridson Jones, Northwich, England, assignors to Imperial Chemical Industries Limited, a corporation of Great Britain No Drawing. Application November 20, 1942, Serial No. 466,386. In Great Britain June 27, 1941

4 Claims. (Cl. 260—94)

This invention relates to improvements in the manufacture of chlorinated products of the normally solid or semi-solid polymers of ethylene. Such polymers are now known as polythenes.

According to U. S. Patent 2,183,556 of Eric W. Fawcett, patented December 19, 1939, the normally solid polymers of ethylene may be halogenated by subjecting them to the action of free halogen or halogen compounds, optionally in the presence of halogen carriers, at room temperature or at moderately elevated temperature, if desired in solution or suspension in a halogen stable medium. The properties of the products are described and it is stated that when they are prepared in the hot they are usually softer and more soluble than those prepared in the cold. The semi-solid polymers of ethylene may also be halogenated by a similar method of halogenation.

British specification 519,422 describes and claims the manufacture of mixtures of chlorinated polythenes having improved properties by chlorinating a solution of polythene in an inert solvent until part of the chlorinated polythene separate as a gel, and then continuing the chlorination until sufficient chlorine has been introduced.

This invention has as an object the manufacture of new and useful compositions of matter. A further object is the production of compositions of matter which are soluble in cold organic solvents, and which have high tensile strengths. A still further object is to provide an improved process for the chlorination of polythene. These and other objects are accomplished by carrying out the process of chlorination in the manner hereinafter described.

According to the present invention chlorinated polythene is manufactured by treating polythene with chlorine in the presence of an inert dispersing medium, part of the chlorination being carried out at a temperature below 45° C., and part of the chlorination being carried out at a temperature between 55° C. and 150° C. In the preferred method of operation the bulk of the chlorination is carried out at the lower temperature and the chlorination is completed at the higher temperature.

The dispersing medium employed must be sufficiently inert not to interfere with the reaction. It may be a medium which dissolves the polythene or partially chlorinated polythene at the higher temperature, such as carbon tetrachloride; in this case the chlorination is carried out partially heterogeneously with two phases present at the lower temperature, and partially homogeneously in a solution at the higher temperature. It may be a medium which causes the polythene or partially chlorinated polythene to swell without being dissolved, such as trichloracetic acid, or it may be a medium which has no action whatever on the polythene or partially chlorinated polythene, such as water. Although there is slight reaction between the water and the chlorine, water is sufficiently inert for the present process. It is convenient to employ a quantity of dispersing medium equal to 5–10 times the weight of polythene. For rapid and convenient reaction it is desirable that the polythene used shall be in a finely divided or dispersed form when it is not in solution. This accelerates the rate of reaction by providing a larger surface area. The polythene may be previously prepared as a powder. Alternatively, when using as a medium a liquid which dissolves polythene in the hot, the polythene may be obtained in a suitably dispersed form for the reaction below 45° C., by dissolving it at an elevated temperature and cooling rapidly with stirring.

In carrying out the process it is desirable to eliminate air from the system, as the presence of air may delay the start of the reaction until a sufficient concentration of chlorine has built up to react with explosive violence.

The process is assisted and may be controlled by irradiating the reaction space with a powerful source of light. Such source of light may be a mercury-in-glass arc, but with this form of illumination the light should be screened to remove light of short wave length if products of high transparency and high solubility are required. Such screening may for example be obtained by a 5 mm. thickness of a 0.2–5% solution of potassium chromate in water. Another useful source of light free from this defect is the so-called "daylight fluorescent tube light." The reaction is also assisted by agitation, e. g. by stirring or by using a sufficient quantity of chlorine for the bubbles to disturb the reaction mixture.

The process may be carried out in batches or continuously. In one method of carrying out a batch process polythene is dissolved in hot carbon tetrachloride and the solution is rapidly cooled with stirring. The suspension of finely divided polythene in carbon tetrachloride is then stirred and illuminated while chlorine gas is passed through after substantially all the air has been removed. The temperature of the reaction mixture is maintained below 45° C. When a selected amount of chlorine has been reacted the temperature is raised and finally the rest of the chlorine is passed in at a temperature between 55° and 150° C. The chlorinated polythene may be isolated from the reaction mixture by removing the dispersing medium, such as by evaporation, or by adding the reaction mixture to a liquid which does not dissolve chlorinated polythene but which is miscible with the carbon tetrachloride with or without evaporation of the carbon tetrachloride.

One method of continuous operation involves the use of two reaction vessels, both of which are stirred and illuminated. The first one is maintained at a temperature below 45° C. by cooling, and the second one at a temperature of 55° C.–150° C. The chlorine is passed into both vessels, and a solution or suspension of polythene in inert medium is fed to the first vessel continuously and flows from this vessel to the second vessel at the same rate. The chlorinated polythene may be separated from the material leaving the second vessel in the same manner as that obtained from the batch process.

It is generally preferred to carry out the bulk of the chlorination at about 15°–40° C., and then complete the chlorination at about 60°–90° C. This serves two objects. The first object is to permit more ready absorption of the last amounts of chlorine, particularly when highly chlorinated polythenes are being obtained, e. g. those containing over 50% chlorine. In the second place the products obtained by this preferred method have certain markedly improved properties; this applies to products containing more than 35% chlorine and especially so to products containing more than 55% chlorine. The most important improvement in the properties of the product is that the product combines the solubility in cold organic solvents of chlorinated polythenes made by hot chlorination with the high tensile strength and high softening point of chlorinated polythenes made by cold chlorination. By the present process products containing about 45% to 60% by weight of chlorine can be obtained in a form in which they are soluble in cold organic solvents and have a tensile strength above 250 kgms. per sq. cm. measured at 20° C., which is greater than that of the corresponding soluble products of the prior art. We can also obtain products containing about 60% to 75% by weight of chlorine which are soluble in cold organic solvents and have a tensile strength above 400 kgms. per sq. cm. measured at 20° C. which is above the corresponding figure obtained for the products of the prior art. By cold organic solvents is meant substances such as carbon tetrachloride, toluene benzene, tetrahydronaphthalene, trichlorethylene, higher ketones and esters. It is usually not soluble in ether, alcohol and trichloracetic acid. The invention is, however, not restricted to this preferred method and chlorination in the hot followed by cold chlorination is within the scope of this invention, and so also are combinations such as hot/cold/hot chlorination.

The products have the same general appearance properties and uses as those made by the prior process and they are in general more satisfactory in use. The high solubility and high softening point make them specially useful as paints, varnishes, dopes and in general for all film-forming and other purposes where it is desirable to employ them in the form of a solution.

The products of the invention are of use in paints, lacquers and dopes, and also for fibres and moulding powders, and for making sheets, tubes, films, and other such articles.

The invention is illustrated but not restricted by the following examples in which the parts are by weight.

*Example 1*

750 parts of polythene of molecular weight 10,000 are dissolved in 10,000 parts of carbon tetrachloride by boiling in a vessel under a reflux condenser. A brisk stream of $CO_2$ is passed through the vessel and the contents are cooled with stirring to 25°–30° C. A controlled stream of chlorine is then passed in at a rate of 10 parts per minute and the reaction mixture is irradiated by a powerful mercury arc lamp. In 5–10 minutes the start of the reaction is shown by the evolution of HCl and a small rapid rise of temperature. Cooling water is used to keep the temperature at about 40° C. After 1½ hours, the chlorine content of the polymer is 40%. The reaction mixture is heated to 60–65° C. and chlorination is continued until the polymer contains 60% chlorine. The product is isolated in a finely divided state from the mixture by violent agitation with hot water and the carbon tetrachloride is distilled off leaving a white solid floating on the water, from which it can be strained off.

*Example 2*

500 parts of polythene of molecular weight 15,000 are dissolved in 10,000 parts of carbon tetrachloride and chlorinated in the same manner as Example 1. The initial chlorination is carried out at a temperature of 35° C., until the chlorinated polythene contains 50% chlorine. The second part of the chlorination is carried to 68% chlorine at a temperature of 65° C. The reaction is irradiated throughout by a fluorescent tube. The product is isolated as in Example 1. It is a soluble, colourless resin of high softening point and tensile strength of 600 kg./sq. cm. at 20° C. and of 250 kg./sq. cm. at 70° C., with 100% extension at this temperature.

For comparison a chlorinated polythene made from the same polythene and containing 68% chlorine and prepared by reaction in the cold, has a tensile strength below 400 kg./sq. cm. at 20° C. and 100 kg./sq. cm. with 200% extension at 70° C.

*Example 3*

Working in the same manner as in Example 2, polythene is chlorinated at 70° C., until its chlorine content is 25%. The reaction mixture is cooled to 35° C. and further chlorinated at this temperature up to 55% chlorine. The reaction is then completed at 70° C. to give a chlorinated polythene containing 67% chlorine. The product combines a slightly higher tensile strength and softening point with greater flexibility than the product of Example 2. It can be formed easily into fibres by spinning a concentrated solution in benzene, and the tensile strength of these fibres may be further increased by drawing at a suitable temperature.

*Example 4*

This example is carried out in the same manner as Example 1, chlorination being continued to 40% in the cold and then to 55% in the hot, and the product separated as before. The product is soluble in cold solvents such as benzene, and when formed into sheets has the toughness and flexibility characteristic of the cold chlorinated material of the same chlorine content.

It does not soften until about 50° C. higher than the corresponding soluble product prepared by chlorination entirely in hot solution.

What we claim is:

1. Chlorinated polythenes containing 60 to 75% by weight of chlorine which are soluble in cold carbon tetrachloride and have a tensile strength above 400 kilograms per square centimeter at 20° C., the polythenes prior to chlorination being normally solid.

2. A process for the manufacture of chlorinated polythene which comprises chlorinating a normally solid polythene in the presence of an inert dispersing medium to about 40 to 50% chlorine at a temperature below 45° C., the total chlorination to from 55 to 75% being effected at a temperature between 55 and 150° C.

3. A continuous process for the manufacture of chlorinated polythene which comprises subjecting normally solid polythene to chlorination at a temperature below 45° C. until from 40 to 50% chlorine has been added and thereafter completing the chlorination at a temperature between 55 and 150° C. until the chlorine content has been increased to a total of from 55 to 75%.

4. A continuous process for the preparation of chlorinated polythene which comprises feeding a solution of normally solid polythene in an inert liquid and chlorine into a reaction zone maintained at a temperature below 45° C. until from about 40 to about 50% chlorine has been introduced, passing the partially chlorinated reaction product into a second reaction zone maintained at a temperature between 55 and 150° C. until a total of 55 to 75% chlorine has been added, and finally discharging the thus chlorinated product from the latter reaction zone.

JAMES R. MYLES.
FRANCIS STEPHEN BRIDSON JONES.